United States Patent [19]
Rude

[11] 3,741,577
[45] June 26, 1973

[54] SLED

[76] Inventor: Steven L. Rude, Route 1, Bemidji, Mich. 56601

[22] Filed: Jan. 25, 1971

[21] Appl. No.: 109,171

[52] U.S. Cl. .................................. 280/18, 280/24
[51] Int. Cl. ............................................ B62b 13/04
[58] Field of Search................. 280/18, 19, 28, 12 R

[56] References Cited
UNITED STATES PATENTS

| | | | |
|---|---|---|---|
| 181,330 | 10/1957 | Yager | 280/18 |
| 201,815 | 8/1965 | Greenberg | 280/18 |
| 2,878,858 | 3/1959 | Winchester | 280/12 B |
| 2,139,513 | 12/1938 | Nelson | 280/18 |

*Primary Examiner*—Leo Friaglia
*Assistant Examiner*—Robert R. Song
*Attorney*—Schroeder, Siegfried & Ryan

[57] ABSTRACT

A snowmobile sled formed as a single one piece molded sled design having a generally rectangular open top, inwardly tapered or inclined sides and a bottom having a straight portion and an inclined portion leading toward the front of the sled. The molded design includes a semi-circular flange in which is positioned a single axis hitch in the form of a tubular member with a journalled rod therein, the rod carrying arms at the extremities of the same which are adapted to attach to the sides of a snowmobile such that the sled will be mounted with the top generally horizontal. The hitch is removably coupled to the sled by means of J shaped flange members which project around a portion of the sled at the top of the same and around the cylindrical member to retain the same on the sled.

3 Claims, 5 Drawing Figures

INVENTOR
Steven L. Rude
BY
Schroeder Siegfried & Ryan
ATTORNEYS

INVENTOR
Steven L. Rude
BY
Schroeder Siegfried & Ryan
ATTORNEYS

SLED

My invention relates to sleds and more particularly to an improved load carrying type sled particularly adapted for use with snowmobiles.

Sleds which are adapted to be towed by or connected to vehicles take a variety of forms. In particular, personnel carrying sleds associated with snowmobiles generally resemble a snowmobile frame structure and are supported by skis which are steerably connected to the snowmobile. Similar load carrying sleds generally include skis or skids. Normally, toboggan or one piece type structures are not suitable for this purpose because of the problems of instability. Such structures do not follow in the snowmobile tread, lack suitable load carrying capacity, and generally are so constructed as to fill up with snow or debris from the track of the snowmobile as it is being towed.

The present invention is directed to a simple one piece molded sled design which is compact, may be readily attached and detached from a snowmobile and has suitable load carrying capacity and ability to track with the snowmobile without collecting snow discharge from the tread. The improved sled design has a tapered or inclined forward bottom section such that it rides over the snow discharged from the snowmobile tread and the remainder of the bottom is shaped such that only a fraction of the surface near the rear of the same actually contacts the snow or surface upon which it is drawn. The edges or sides are rounded such that the sled will bank with the snowmobile and the same is coupled to the snowmobile through a single pivot axis such that it tracks and follows the snowmobile in turns with a solid connection and pivots only with pitch of the snowmobile. This improved sled design includes a wear surface on the contacting portion of the bottom such that it will not be damaged when drawn over surfaces other than snow. It further includes a quick coupling and decoupling structure which enables the same to be connected to or removed from a snowmobile in a simple manner.

Therefore it is the principal object of this invention to provide an improved load carrying type sled for snowmobiles.

Another object of this invention is to provide in an improved sled a single composite one piece molded structure which will follow a snowmobile with stability and provide load carrying ability.

Another object of this invention is to provide in an improved sled of this type a quick coupling and decoupling feature.

A further object of this invention is to provide in an improved sled special wear surfaces to increase the life of the same.

These and other objects of this invention will become apparent from a reading of the attached description together with the drawings wherein.

Figure 1:
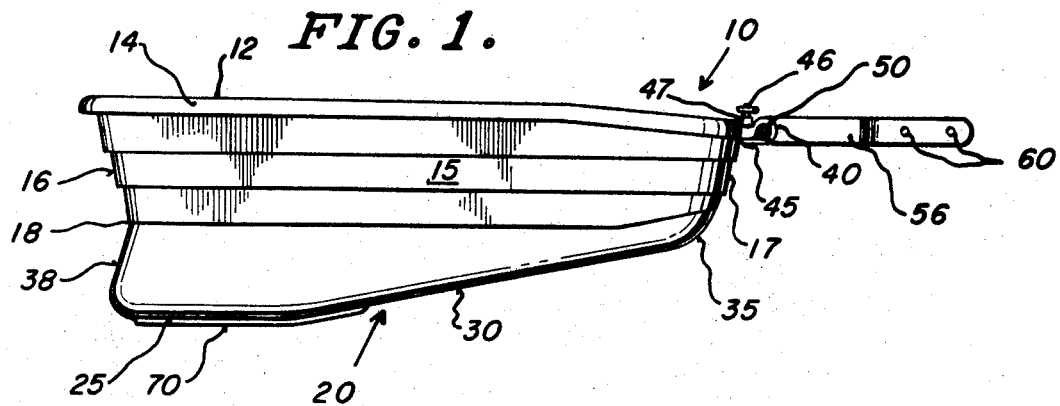
FIG. 1 is a side elevation view of the improved snowmobile sled.
Figure 2:
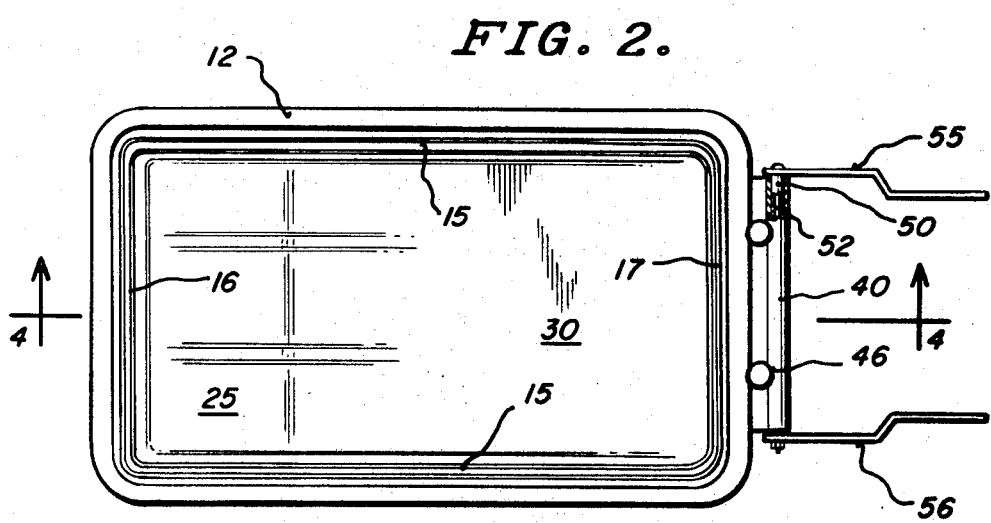
FIG. 2 is a plan view of the sled of FIG. 1 showing the hitch for the same and with parts broken away.
Figure 3:
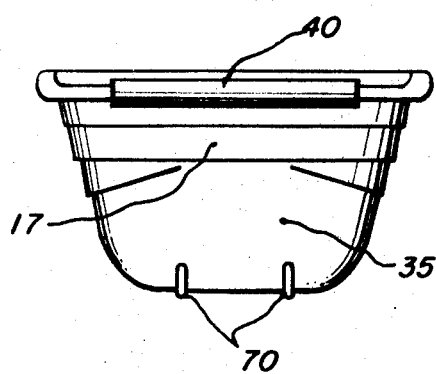
FIG. 3 is a front elevation view of the sled of FIG. 2.
Figure 4:
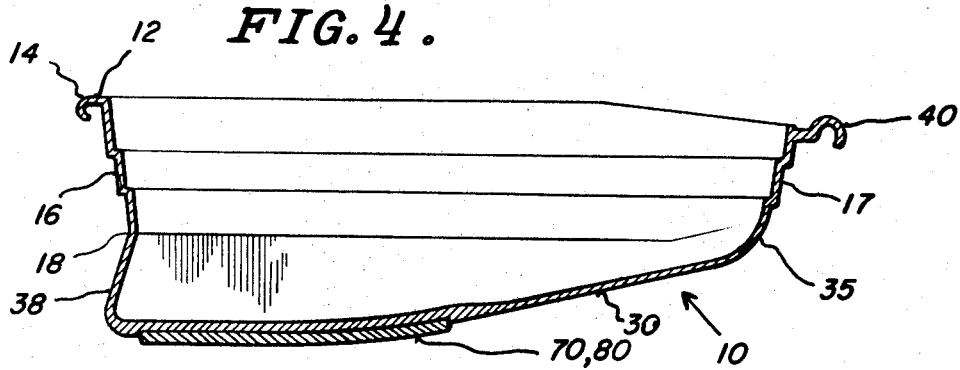
FIG. 4 is a sectional view of the sled of FIG. 2 taken along the lines 4—4 therein.

My improved sled is shown generally at 10 in the drawings. As will be seen in FIGS. 1 and 2, the sled has a generally flat rectangular shaped top, as indicated 12, with the corners of the same rounded and the upper edges rolled or turned over as indicated at 14. The sled is open at the top side and the length of the sled is approximately two to three times the width of the same. The side walls of the sled, as indicated at 15, and the end walls 16, 17 at the back and front, respectively, of the same are inwardly sloped and stepped to provide a ribbed structure as indicated at 18. Formed integral with the side walls and end walls is a bottom portion indicated generally at 20. The entire structure is a molded unit preferably made of a fiberglass material. The bottom portion includes a flat section near one end of the same and indicated at 25 and an inclined section 30 which bears an angular relationship of approximately 15 degrees to the flat section with the flat and inclined sections being joined to the sides by curved portions 35 having a substantially uniform radius of curvature. As indicated in FIG. 1 one end of the bottom which forms the rear of the sled has an inwardly canted or sloped rear wall joining with the rear side 16 of the sled to provide a notched or inwardly sloped rear surface, as indicated at 38. The latter is for aesthetic purposes only. The sides of the inclined section and bottom section are curved to meet the side walls 15 providing a continuation of the inwardly sloped side wall surfaces.

One end wall or side of the top portion has an additional semicircular flange 40 formed integral with the rolled over portion and extending substantially across the width of the same, the semicircular flange providing a means for attaching a coupling member thereto as will be hereinafter defined. Through this additional flange section are positioned a pair of J shaped latch members 45, the latch members sliding in apertures molded into the flange section 40. The latch members have a knob or head 46 and a suitable bias spring 47 encircling the body of the same above the flange to bias the latch members upwardly such that the curved opposite end of the same approaches the free extremity of the flange member 40. This will provide an enclosing structure for the hitch, as will be hereinafter identified.

The hitch is formed by a cylindrical member 50 which is adapted to be positioned in the recess formed by the cross section of the flange 40 and retained therein by the J shaped or curved locking members 45. Within the sleeve or cylindrical member 50 is a rod 52 which is journaled therein for rotative movement with the ends of the rod extending beyond the sleeve and mounting a pair of arms 55, 56, the free extremities of which have mounting apertures 60 positioned therein. The arms may be bent along their extent, as indicated at 62, to define a width at the extremities which will fit around the end of a snowmobile frame such that suitable bolt members may be positioned through the apertures to secure the arms permanently to the snowmobile frame (not shown). The shaft 52 and sleeve member 50 define a rotative axis for the arms 55, 56 of the hitch which is parallel to and concentric with the axis of the concentric cross section of the flange 40. This rotative axis of the hitch will permit pitching movement of the sled with pitching movement of the snowmobile.

Figure 5:
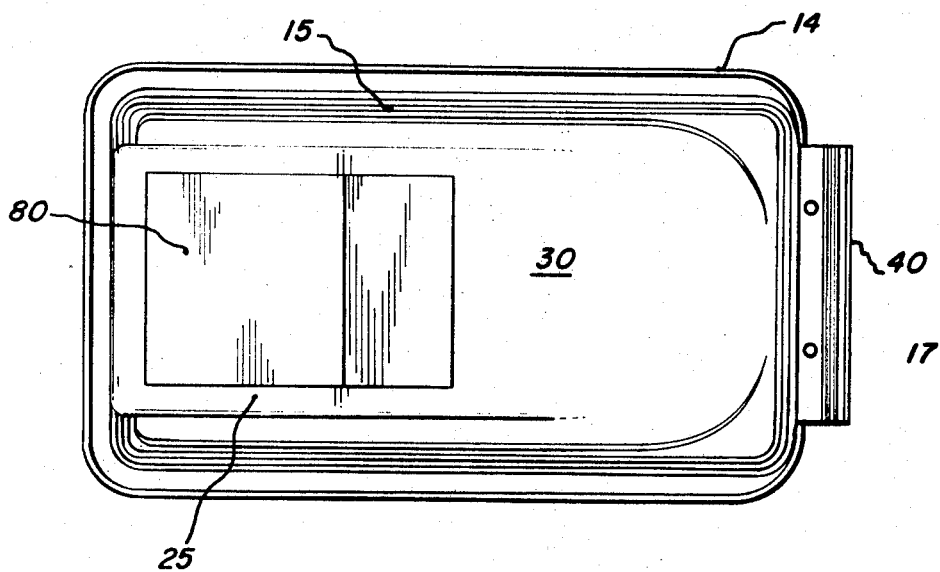
FIG. 5 is an alternate embodiment of the sled showing a different type wear surface on the bottom of the same.

On the base of the sled and extending across flat section 25 thereof and into the inclined section 30 are a pair of metal wear support rods 70 which are suitably attached through the molded fiberglass body. These will define a wear surface such that when the sled is dragged across a surface other than snow, for example, concrete or rough grounds, the rods will support the portion of the sled in contact with such surfaces to prevent abrasions which deface the fiberglass body. As an alternate embodiment of this construction, and as will be seen in FIG. 5, a suitable wear plate 80 in the form of a steel member may be attached or suitably molded into the fiberglass body across the flat section 25 thereof into the inclined section 30 of the bottom to provide a wear surface which will absorb any abrasions to enhance the life of the sled.

The improved sled is adapted to be readily coupled and decoupled to a snowmobile mounting the hitch member formed by the sleeve 50 and rod 52 together with the arms 55, 56. The sleeve member is inserted into the cross-sectional opening of the flange 40 and the arms 55, 56 will be so mounted on the snowmobile that the hitch member will position the top surface of the sled in a substantially horizontal position. The inclined section 30 will be out of contact with the surface on which the sled is positioned such that snow from the tread of the snowmobile will be thrown under the sled as the sled is being towed. The sled is positively coupled to the snowmobile about the turning axis and allowed to pivot about the pitch axis to absorb bumpy terrain. In the turning mode or movement of the snowmobile and particularly in banked conditions, the curved surfaces on the bottom section will ride on the snow allowing the sled to track and follow the snowmobile. The sled provides a side enclosed and top open structure for the purpose of carrying a load. A suitable cover may be attached over the same and the improved sled will provide an adequate load carrying structure which is highly stable, will follow the snowmobile and track behind the same without collecting snow from the tread on top of the same.

In considering this invention it should be remembered that the present disclosure is illustrative only and the scope of the invention should be determined by the appended claims.

What is claimed is:

1. A sled comprising, a unitary shell member of fiberglass material having a generally rectangular open top portion and inwardly sloped sides and front wall and a rear wall all extending from the top to a closed bottom portion, the forward side of the top portion having an open-ended flange section semicircular in cross section extending forwardly therefrom and substantially across the width of said front side, said flange defining towing and engaging means, said closed bottom portion having a ground engaging flat section substantially parallel with the rectangular top portion and located adjacent the rear side thereof, the balance of said bottom portion being an inclined section extending from the forward end of said flat section to the lower portion of said front wall having the flange section thereon, said flat and inclined sections of the closed bottom portion of the shell member being joined with the inwardly sloped sides thereof through curved portions having a substantially uniform radius of curvature, said inclined section bearing an angular relationship of approximately 15 degrees to the flat section forming the bottom portion of the shell member, and wear surface means joined to the outer surface of the flat section of the closed bottom portion of the shell member.

2. The sled of claim 1 in which the wear surface is a pair of wear rib members extending longitudinally of the rectangular shell member and fastened to the flat section of the closed bottom portion.

3. The sled of claim 1 in which the wear surface includes a wear plate attached to the flat section of the closed bottom portion of the shell member.

* * * * *